(12) United States Patent
Beck et al.

(10) Patent No.: US 7,627,898 B2
(45) Date of Patent: Dec. 1, 2009

(54) METHOD AND SYSTEM FOR DETECTING INFECTION OF AN OPERATING SYSTEM

(75) Inventors: Douglas Reed Beck, Seattle, WA (US); Aaron Roy Johnson, Lynnwood, WA (US); Roussi A. Roussev, Melbourne, FL (US); Chad E. Verbowski, Redmond, WA (US); Binh Dou Vo, Berkeley Heights, NJ (US); Yi-Min Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 616 days.

(21) Appl. No.: 10/997,768

(22) Filed: Nov. 23, 2004

(65) Prior Publication Data

US 2006/0031673 A1 Feb. 9, 2006

Related U.S. Application Data

(60) Provisional application No. 60/590,478, filed on Jul. 23, 2004.

(51) Int. Cl.
*G08B 23/00* (2006.01)
(52) U.S. Cl. .................. 726/23; 726/25; 713/188
(58) Field of Classification Search .......... 726/25, 726/23
See application file for complete search history.

(56) References Cited

U.S. PATENT DOCUMENTS 6,550,060 B1 * 4/2003 Hammond .......... 717/162

2004/0039921 A1 * 2/2004 Chuang .................. 713/187

OTHER PUBLICATIONS

T. Garfinkel and M. Rosenblum. "A Virtual Machine Introspection Based Architecture for Intrusion Detection". In Proceedings of the Symposium on Network and Distributed Systems Security (SNDSS), pp. 191-206, Feb. 2003.*
Busleiman, Arturo, "Detecting and Understating Rootkits," Sep. 2003.*
NISCC Technical note Aug. 2003, "Trojan Horse Programs and Rootkits", Issued: Sep. 10, 2003.*
Landsberg, G.L.; "Computer viruses and methods of combating them"; Institute of High Energy Physics, Protvino, Moscow Region, American Institute of Physics, Feb. 1991, pp. 185-200.*

(Continued)

*Primary Examiner*—Kimyen Vu
*Assistant Examiner*—Yogesh Paliwal
(74) *Attorney, Agent, or Firm*—Perkins Coie LLP

(57) ABSTRACT

A method and system for detecting that a software system has been infected by software that attempts to hide properties related to the software system is provided. A detection system identifies that a suspect operating system has been infected by malware by comparing properties related to the suspect operating system as reported by the suspect operating system to properties as reported by another operating system that is assumed to be clean. The detection system compares the reported properties to the actual properties to identify any significant differences. A significant difference, such as the presence of an actual file not reported by the suspect operating system, may indicate that the suspect storage device is infected.

7 Claims, 4 Drawing Sheets

OTHER PUBLICATIONS

U.S. Appl. No. 11/183,318, filed Jul. 15, 2005, Yan et al.

Muttik, Igor, "Stripping Down an AV Engine," Virus Bulletin Conference, Sep. 2000, pp. 59-68.

"Working with the AppInit_DLLs registry value," Microsoft Corporation, Article ID 197571, last review Feb. 19, 2005, revision 4.0, 1 page, http://support.microsoft.com/default.aspx?scid=kb;en-us;197571.

Wang, Yi-Min, Binh Vo, Roussi Roussev, Chad Verbowski and Aaron Johnson, "Strider GhostBuster: Why It's A Bad Idea For Stealth Software To Hide Files," Microsoft Research, Redmond, Aug. 2004, 1 page.

"AppInit_DLLs Registry Value and Windows 95," Microsoft Corporation, Article ID 134655, last review Mar. 1, 2005, revision 3.2, 2 pages, http://support.microsoft.com/kb/134655/.

Poulsen, Kevin, "Windows Root Kits a Stealthy Threat," SecurityFocus News, Mar. 5, 2003 (3 pages).

Altunergil, Oktay, "Understanding Rootkits," Linus Devcenter.com, Dec. 14, 2001 (3 pages).

Altunergil, Oktay, "Scanning for Tootkits," Linux Devcenter.com, Feb. 7, 2002 (8 pages).

Busleiman, Arturo, "Detecting and Understanding Rootkits," Sep. 2003 (13 pages).

Altunergil, Oktay, "Understanding Rootkits," Linux Devcenter.com, Dec. 14, 2001 (5 pages).

Altunergil, Oktay, "Scanning for Rootkits," Linux Devcenter.com, Feb. 7, 2002 (4 pages).

BIOS Boot Specification, Compaq Computer Corporation, Phoenix Technologies, Ltd., Intel Corporation, Version 1.01, Jan. 11, 1996 (46 pages).

"How to Use the Windiff.exe Utility," Microsoft Knowlege Base Article—159214, Copyright 2004, Microsoft Corporation (3 pages) http://support.microsoft.com/default.aspx?scid=kb;en-us;159214.

Poulsen, Kevin, "Windows Root Kits a Stealthy Threat," The Register, SecurityFocus Online, Mar. 7, 2003 (3 pages).

Dittrich, "Root Kits and Hiding Files/Directories/Processes After a Break-in," Jan. 2002 (12 pages).

U.S. Appl. No. 11/183,225, filed Jul. 15, 2005, Beck et al.

Wang, Yi-Min, Binh Vo, Roussi Roussev, Chad Verbowski and Aaron Johnson, "Strider GhostBuster: Why It's A Bad Idea For Stealth Software To Hide Files," Microsoft Research Technical Report MSR-TR-2004-71, Jul. 24, 2004 (15 pages).

Wang, Yi-Min, Doug Beck, Binh Vo, Roussi Roussev and Chad Verbowski, "Detecting Stealth Software with Strider GhostBuster," Microsoft Research Technical Report MSR-TR-2005-25, Feb. 21, 2005 (11 pages).

Wang, Yi-Min, Roussi Roussev, Chad Verbowski, Aaron Johnson and David Ladd, "AskStrider: What Has Changed on My Machine Lately?," Microsoft Research Technical Report MSR-TR-2004-03, Jan. 5, 2004 (13 pages).

Kodmaker@syshell.org, "NTIllusion: A Portable Win 32 userland rootkit," Phrack Inc., Jul. 13, 2004 (28 pages) http://www.phrack.org/show.php?p=62&a=12.

holy_father@phreaker.net, "Invisibility on NT boxes—How to become unseen on Windows NT," Code Breakers Journal, vol. 1, No. 2 (2004), May 8, 2003 (26 pages).

NTQuerySystemInformation, Microsoft, Copyright 2005 (4 pages) http://msdn.microsoft.com/library/en-s/sysinfo/base/ntquerysysteminformation.asp?frame=true.

Schneier, Bruce, "Schneier on Security: GhostBuster:—A weblog covering security and security technology," Feb. 15, 2005 http://www.schneier.com/blog/archives/2005/02/ghostbuster.html.

Wang, Yi-Min and Doug Beck, "How to 'Root' a Rootkit That Supports Root Processes Using Strider GhostBuster Enterprise Scanner," Microsoft Research Technical Report MSR-TR-2005-21, Feb. 11, 2005 (2 pages).

Altunergil, Oktay, "Scanning for Rootkits," Linux Devcenter.com, Feb. 7, 2002 (8 pages).

www.phrack.org, Phrack 62 download, 337kb, Jul. 13, 2004, pp. 1-28.

* cited by examiner

METHOD AND SYSTEM FOR DETECTING INFECTION OF AN OPERATING SYSTEM

CROSS-REFERENCE TO RELATED APPLICATION(S)

This application claims the benefit of U.S. Provisional Application No. 60/590,478, entitled "METHOD AND SYSTEM FOR DETECTING INFECTION OF AN OPERATING SYSTEM," filed Jul. 23, 2004, which application is incorporated by reference herein in its entirety.

TECHNICAL FIELD

The described technology relates generally to detecting that an operating system has been modified.

BACKGROUND

Although the Internet has had great successes in facilitating communications between computer systems and enabling electronic commerce, the computer systems connected to the Internet have been under almost constant attack by hackers seeking to disrupt their operation. Many of the attacks seek to exploit vulnerabilities of the application programs, operating systems, and other computer programs executing on those computer systems. One of the most destructive methods of attacking a computer system has been to modify portions of the operating system that is stored on a boot storage device with software that may perform many of the same functions of the operating system, but also includes malicious functions. These modifications can be either to replace portions of the operating system or to add new programs that are automatically started by the operating system. Such software is referred to as "malware" because of its malicious nature. Once malware is installed on a boot storage device, the operating system is "infected" and the malware can control all aspects of the computer system. Such malware includes Root-Kits, Trojans, keystroke loggers, and so on. For example, the malware could intercept keystrokes that a user enters (e.g., a password) and report them to another computer system. As another example, the malware could be a worm that launches a self-propagating attack that exploits a vulnerability of a computer system by taking control and using that computer system to find other computer systems with the same vulnerability and launch attacks (i.e., sending the same worm) against them.

To prevent detection, malware often uses advanced stealth techniques to make executable files or data files (e.g., recorded keystroke files) "invisible." Once malware is started, it may intercept all file queries at a very low level (e.g., kernel mode) and use filtering to ensure that a chosen subset of files is never revealed to any file query operations by any program running on the infected computer system. For example, a keystroke logger may intercept all requests from programs for file listings and delete the name of its log file from the list that is returned to the programs. The keystroke logger may even intercept requests for available disk space and add the size of the log file to the available disk space to make it difficult to detect the presence of the log file. These stealth techniques can defeat both experienced system administrators who use common operating system utilities, such as WINDOWS Explorer, a directory list command, a registry editor, a task manger, and so on, to search the file system and configuration files (e.g., registry files) for suspicious entries, and commonly used malware scanning tools that are based on known malware file signatures.

Many different techniques have been used to help detect the presence of such malware; unfortunately, detection of some malware has proved to be difficult. One technique attempts to identify the presence of malware by the presence of an open port. Malware may install a backdoor so that the computer system can be accessed at a later time. The backdoor opens a port through which another computer system can gain access to the infected computer system. The technique can initiate a port scan from another computer system to detect the presence of an open port. If, however, the malware only opens a port at designated times, then the scanning may not detect the open port. Another technique may compare the files of the infected operating system with files of a non-infected or "clean" operating system. In particular, the technique may generated hash codes for the files of the infected operating system and compare them to hash codes of the clean operating system. However, since the malware may have total control over the computer system, it can provide the clean version, rather than the infected version, of a file to a program that is calculating the hash codes.

Because of the difficulty in detecting malware, some computer users have resorted to reinstalling an operating system onto a storage device that might be infected from a storage device that contains a copy of the operating system that is known (or thought) to be clean. Such reinstalling of an operating system is time-consuming. Moreover, such reinstalling is unnecessary if the operating system was not actually infected—although the user could not be sure that it was not infected.

It would be desirable to have a technique that would detect the presence or possible presence of malware stored on a storage device.

SUMMARY

A method and system for detecting that an operating system is not correctly reporting file properties is provided. The detection system requests that a suspect operating system loaded from a suspect storage device (e.g., suspected of being infected) during a boot up of a computer system provide a report of file properties of the files on the suspect storage device. The detection system also requests that a clean operating system loaded from a clean storage device during another boot up of the computer system provide the actual file properties of the files on the suspect storage device. The detection system then compares the reported file properties to the actual file properties. If the detection system detects a significant difference between the reported and actual file properties, then the suspect storage device may be infected with malware.

DETAILED DESCRIPTION

Figure 1:
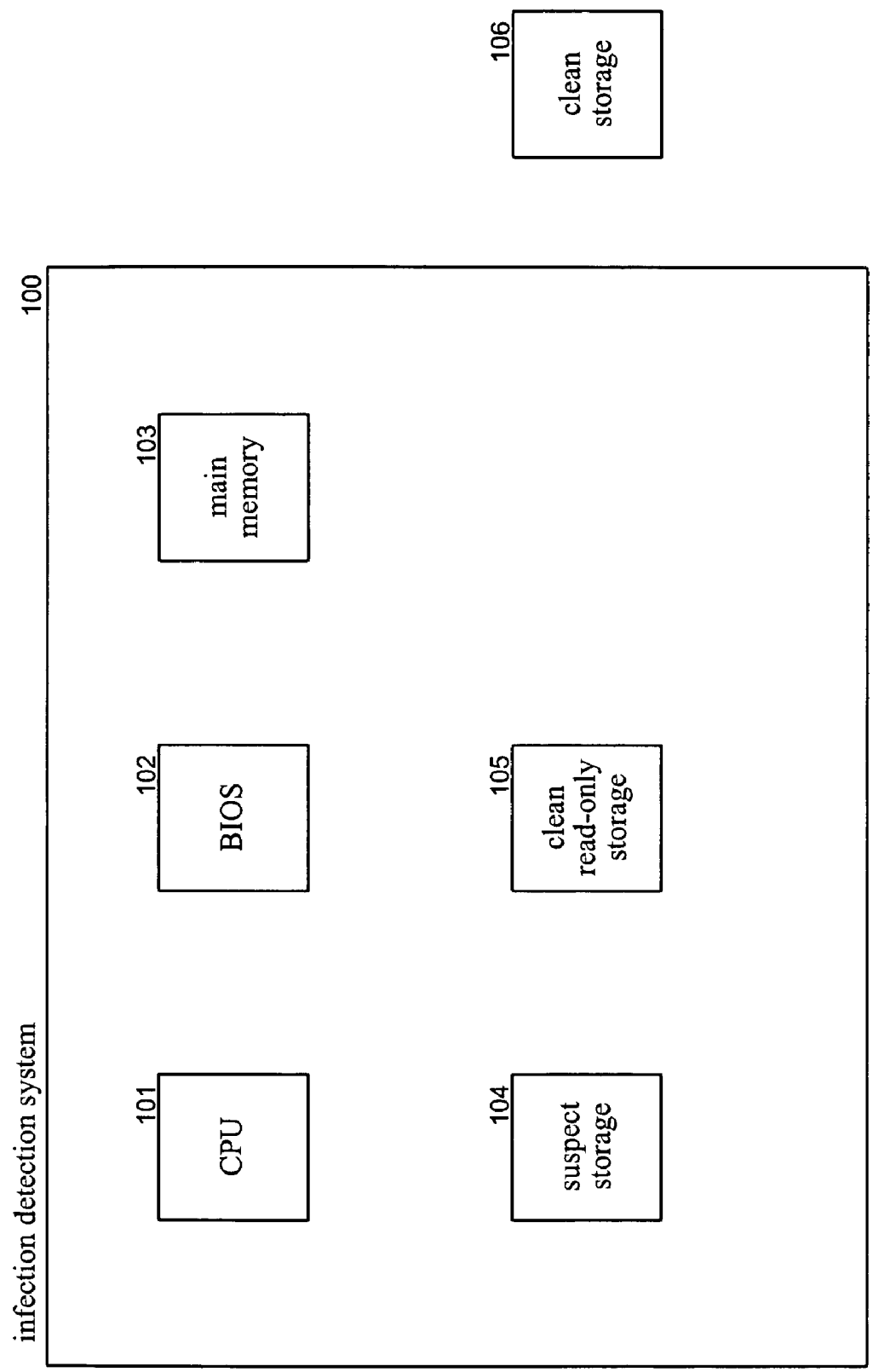
FIG. 1 is a block diagram that illustrates an environment in which the detection system executes in one embodiment.

A method and system for detecting that a software system has been infected by malware that attempts to hide properties of a file is provided. In one embodiment, a detection system identifies that a suspect operating system has been infected by malware by comparing reported file properties of a suspect storage device (e.g., one that contains the suspect operating system) as reported by the suspect operating system to actual file properties of the suspect storage device as determined by another operating system that is assumed to be clean. The detection system initially boots a computer system from a suspect storage device that contains the suspect operating system. A suspect storage device is one in which the suspect operating system may report file properties that are different from the actual file properties in an attempt to hide malware. A suspect storage device may be the boot storage device of the operating system or some other storage device. "Booting" is the process of loading an operating system from a storage device into memory of the computer system at initial program load time. The detection system requests the suspect operating system to provide a report of file properties of the files stored on the suspect storage device. The file properties may include file name, file size, date created, date last modified, file checksum, and so on. The detection system may store the reported file properties on the suspect storage device or another storage device. The detection system then boots the computer system from a clean storage device that contains a clean operating system. The detection system requests the clean operating system to provide the actual file properties of the files stored on the suspect storage device. The detection system compares the reported file properties to the actual file properties to identify any significant differences. A significant difference, such as the presence of an actual file not reported by the suspect operating system, may indicate that the suspect storage device is infected with malware. If the malware of the infected operating system attempts to hide its presence by filtering the reported file properties, then the comparison between the reported file properties and the actual file properties will reveal the attempt. If, however, the malware does not attempt to hide its presence when reporting the file properties, then the comparison will not reveal any significant differences. In such a case, the detection system could then check the actual file properties (or reported file properties since there are no significant differences) for known malware signatures. Since the malware did not attempt to hide its presence, the checking for signatures will reveal the presence of a malware whose signature is known. In this way, the presence of malware can be detected even though the malware may attempt to conceal its presence.

In one embodiment, the detection system may attempt to identify whether a suspect operating system has been infected by malware by comparing reported file properties generated by a high-level scan and a low-level scan using the suspect operating system. A high-level scan collects file properties using high-level functions of the suspect operating system such as an application programming interface ("API") to the system registry or a directory list command provided by the suspect operating system. A low-level scan collects file properties using low-level functions of the suspect operating system such as a read disk sector command. For example, by comparing the file properties reported by a directory list command to those identified by using the read disk sector command to traverse the directory structure, the detection system can identify malware that modified the behavior of high-level commands, but does not modify the behavior of low-level commands.

As another example, malware may use the Auto-Start Extensibility Points ("ASEPs") of the system registry to start execution. Such malware may then hide its presence by intercepting calls to the registry APIs and not reporting its ASEP entry. The detection system can detect such attempts to hide malware by comparing the information returned by the registry APIs to information derived by a low-level parsing of the system registry (e.g., by using the read disk sector command or by directly parsing the files of the system registry using the file system APIs). Although comparison of high-level scans to low-level scans may not be as effective at detecting malware as the comparison when a clean operating system is booted, such comparison, because it does not require rebooting, can be performed frequently and may identify most malware.

In one embodiment, the detection system can use the attempt of malware to hide its presence to counteract the malware. For example, the detection system can remove ASEP entries that are hidden by exporting a parent key of the hidden ASEP entry, deleting the parent key from the system registry, and then importing the exported parent key. Because the export function relies on the registry APIs, the export function will not export the hidden entries and thus the hidden entries will not be recreated by the import function. Such exporting based on malware-provided information followed by deleting and importing may be effective in many situations to counteract the malware. In certain situations, the deleting may not be effective at removing all resources (e.g., registry entries and files). If so, a lower level delete technique may be used. However, certain malware may intercept at the lower level and hide the resources from the deletion.

In one embodiment, the detection system detects the presence of a data logger by inputting data to the computer system after file properties of a suspect storage device have been reported by a suspect operating system. For example, a user may input keystrokes that are collected by a keystroke logger and then stored within a log file on the suspect storage device. If a keystroke logger is present, then the file properties of the log file will be changed as a result of the entry of the keystrokes. For example, the log file may be increased in size, or its checksum may be changed. When the computer system is then booted using the clean storage device, the comparison of the actual file properties to the reported file properties may reveal a difference resulting from the logging of the keystroke information by the keystroke logger. This difference indicates that the suspect storage device is infected with a keystroke logger. Thus, the presence of a keystroke logger can be detected even when the suspect operating system correctly reports the presence of the log file. Another example of a data logger is a screen-capture spy program, which may store each screen capture as a new file. Thus, the detection system can analyze the reported and actual file properties to determine whether any unreported files may indicate the presence of a screen-capture spy program.

In one embodiment, the detection system executing on a computer system booted from a clean storage device may boot a virtual machine using the suspect storage device. A virtual machine provides an environment to the suspect operating system that looks to the suspect operating system as if it is in control of the entire computer system, when it is not. The suspect operating system may be unable to ascertain whether it is executing within a virtual machine or within a real machine. The detection system, such as a program executing within the virtual machine, requests the suspect operating system to report the file properties, which the program can store on the suspect storage device or some other storage device. The detection system executing on the real machine under the control of the clean operating system can collect the actual file properties of the files of the suspect storage device. The detection system can then compare the reported file properties to the actual file properties to determine whether the suspect operating system has attempted to hide file properties. By using a virtual machine, the detection system can identify whether a suspect operating system has been infected without requiring the computer system to be booted using the suspect storage device—only the virtual machine need be booted using the suspect storage device.

In one embodiment, the detection system attempts to identify visible malware by comparing reported file properties to previously collected actual file properties to determine whether a suspect storage device has been infected since the last reporting with malware that does not attempt to hide its presence. The detection system may initially compare reported file properties to currently collected actual file properties. If the comparison indicates no significant differences, then the detection system may compare the reported file properties to previously collected actual file properties. The previously collected actual file properties may be stored on a write-once device so that malware cannot change the stored file properties. If a significant difference exists, then the suspect storage device may have been infected by visible malware since the previously collected actual file properties were collected. Since many of the differences may not be a result of malware, the detection system may check the differences for the signatures of known malware or request a user to examine the differences. To speed the process of comparing the file properties, the detection system may focus its comparison on files or configuration information related to auto-start programs that are automatically started at boot time.

In one embodiment, the detection system may request a user to boot a computer system from a clean storage device known to contain a clean operating system that is not the primary boot storage device of the computer system. Once booted, the detection system can request the clean operating system to provide the actual file properties. The booting of the computer system from the clean storage device can be performed either before or after the file properties are reported by the suspect operating system. The clean storage device may be a read-only device such as a CD-ROM that contains the clean operating system. The suspect storage device may be a hard disk that contains the suspect operating system. The suspect storage device may be the primary boot storage device for the computer system. At startup, the computer system under control of the boot program, such as BIOS, may provide the user the opportunity to select an alternate boot storage device. In such case, the user can select to boot the computer system from the clean storage device that includes the clean operating system. Alternatively, the clean storage device could be a read-only device (e.g., ROM) that is installed on the computer system. Because the clean storage device is read-only, an infected operating system would be unable to modify the clean operating system stored on the clean storage device. The clean operating system need only have the capabilities necessary to collect the actual file properties of the suspect storage device. In particular, the clean operating system does not need to be a clean version of the suspect operating system and does not need to provide all the functionality of a typical operating system. The functionality required to collect the actual file properties may even be included in BIOS itself. The comparison of the actual file properties to the reported file properties could be performed by another computer system and/or under control of another operating system.

In one embodiment, the detection system may be installed on a removable device, such as a CD-ROM, that has an automatic execution capability and that is a boot device with a clean operating system. When the removable device is connected to a computer system under control of the suspect operating system, a program of the detection system on the removable device is automatically executed and collects and stores the reported file properties. After storing the reported file properties, the detection system can then request the user to boot the computer system from the removable device. When the computer system is rebooted, the clean operating system takes control of the computer system, and the detection system, which can be automatically started, can then collect the actual file properties and compare them to the reported file properties. The detection system may also request the user to input keystrokes after the reported file properties are collected so that the detection system can identify changes in file properties that may be a result of a keystroke logger. The detection system may also request the user to abnormally terminate execution of the suspect operating system (e.g., by pressing a reset button on the computer system or interrupting power to the computer system), rather than a normal termination (e.g., by requesting the suspect operating system to shut down). Abnormal termination may be desired because normal termination may result in writing additional data to the suspect storage device, which would result in more differences between the reported file properties and the actual file properties that are unrelated to determining whether the suspect storage device is infected.

In one embodiment, the detection system may interact with a user to help make it difficult for malware to detect the presence of the detection system. A user may use a real-time detection system generation tool executing with a clean operating system to generate a new version of the detection system whose behavior or binary signature is in some way obfuscated. For example, the generation tool may prompt the user to create and provide a new name for the file in which the reported file properties are to be stored or may randomly generate a new name and provide it to the user. The user would then be prompted to enter the name for the file containing the reported file properties so that the file with that name can be compared to the file containing the actual file properties. As another example, the generation tool may prompt the user for or generate a random number that is used to control the order in which files are scanned. The random number may be a seed number that is used to generate a sequence of random numbers. The generation tool would generate the detection system to scan the directory structure through a suspect operating system in an order defined by the sequence of random numbers, rather than in an alphabetical order defined by a standard directory list command. The scanning in a non-standard order and use of random file names may make it more difficult for malware to detect the presence of the detection system and thus more difficult to take countermeasures to prevent its detection.

In one embodiment, the detection system can detect when malware selectively tries to hide a file from certain processes. To detect the selective hiding, the detection system may inject code into each process by creating a remote thread that loads a dynamic link library containing the code or causing the dynamic link library to be loaded into most of the processes through existing mechanisms such as hooking the Appinit_DLLs registry entry. The injected code requests file properties from the operating system and logs the reported file properties on a per-process basis. When the remote thread is part of a process from which the malware is hiding, the reported file properties will be filtered by the malware for such threads. The detection system can then detect the process-specific hiding after booting from the clean operating system by comparing the file properties reported by the code executing in the different processes. In addition, if the file hiding is targeted at certain processes, the comparison of the reported file properties for each process may detect the hiding.

The detection system may be used to detect the hiding by malware of resources other than file properties. The detection system may be used to check for the presence of malware (e.g., as evidenced by running processes or loaded drivers) by analyzing volatile data structures (e.g., stored only in main memory) used by a suspect operating system. The detection system executing under the suspect operating system can request the suspect operating system using APIs to provide a list of resources such as running processes and loaded modules or drivers. The malware may hide certain resources by intercepting that API. The detection system executing under a clean operating system (e.g., on a different computer system) may copy to a file without interception by the suspect operating system the relevant memory space containing the data structures. The detection system executing under the clean operating system can then parse the memory space to identify the list of resources. For example, the detection system may parse the thread control block data structures to identify the running process. The detection system executing under the clean operating system then compares the list of resources provided by the suspect operating system to a list identified from the copied memory space to determine whether any of the resources were hidden by malware infecting the suspect operating system. The relevant memory space without interception by the suspect operating system can be copied to a file by causing an abnormal termination of the execution of the suspect operating system (e.g., a blue screen or hibernation of the computer system) that results in a dump of memory to a file. The relevant memory space can also be copied using direct memory access ("DMA") techniques without the knowledge of the suspect operating system. DMA copying to a file may be performed by a DMA card that is plugged into the computer system and connected to another computer system or storage device. Such DMA cards are described in Bohra, A., Neamtiu, I., Gallard, P., Sultan, F., and Iftode, L., "Remote Repair of Operating System State Using Backdoors," Proc. Int. Conf. on Autonomic Computing (ICAC), pp. 256-263, May 2004; and Petroni, N., Fraser, T., Molina, J., and Arbaugh, W., "Copilot—a Coprocessor-based Kernel Runtime Integrity Monitor," Proc. Usenix Security Symposium, August 2004.

FIG. 1 is a block diagram that illustrates an environment in which the detection system executes in one embodiment. The computer system 100 may be suspected as having an infected operating system stored on an infected storage device. The computer system includes a central processing unit 101, a BIOS 102, a memory 103, a suspect storage device 104, and a clean read-only storage device 105 or a clean removable storage device 106. In normal operation, the computer system starts executing instructions of the BIOS at startup. The instructions of the BIOS cause portions of the suspect operating system stored on the suspect storage device to be loaded into main memory and then executed. A portion of the detection system may be stored on the suspect storage device. When that portion is executed, it requests the suspect operating system to report the file properties of the suspect storage device. Alternatively, a user may request the suspect operating system to report the file properties by executing a directory display command (e.g., "dir /S /B" of a WINDOWS-based operating system) and storing the result in a file on the suspect storage device. After the reported file properties are stored, the user may reset the computer system to boot from a clean storage device. The clean read-only storage device may be a non-removable device that is installed on the computer system (e.g., ROM), and the clean removable storage device may be a writeable device such as a CD. The user may then request the clean operating system to provide the actual file properties of the suspect storage device by executing the directory display command and storing the result in a file. The user can then run a program (e.g., Windiff.exe) to compare the files containing the reported file properties and the actual file properties. The user can then review the differences and assess their significance. Thus, the detection process can be completely automated (e.g., using a virtual machine) or require some user interaction (e.g., inserting a clean storage device and resetting the computer system).

The computing device on which the detection system is implemented may include a central processing unit, memory, input devices (e.g., keyboard and pointing devices), output devices (e.g., display devices), and storage devices (e.g., disk drives). The memory and storage devices are computer-readable media that may contain instructions that implement the detection system. In addition, the data structures and message structures may be stored or transmitted via a data transmission medium, such as a signal on a communications link. Various communications links may be used, such as the Internet, a local area network, a wide area network, or a point-to-point dial-up connection.

The detection system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The detection system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
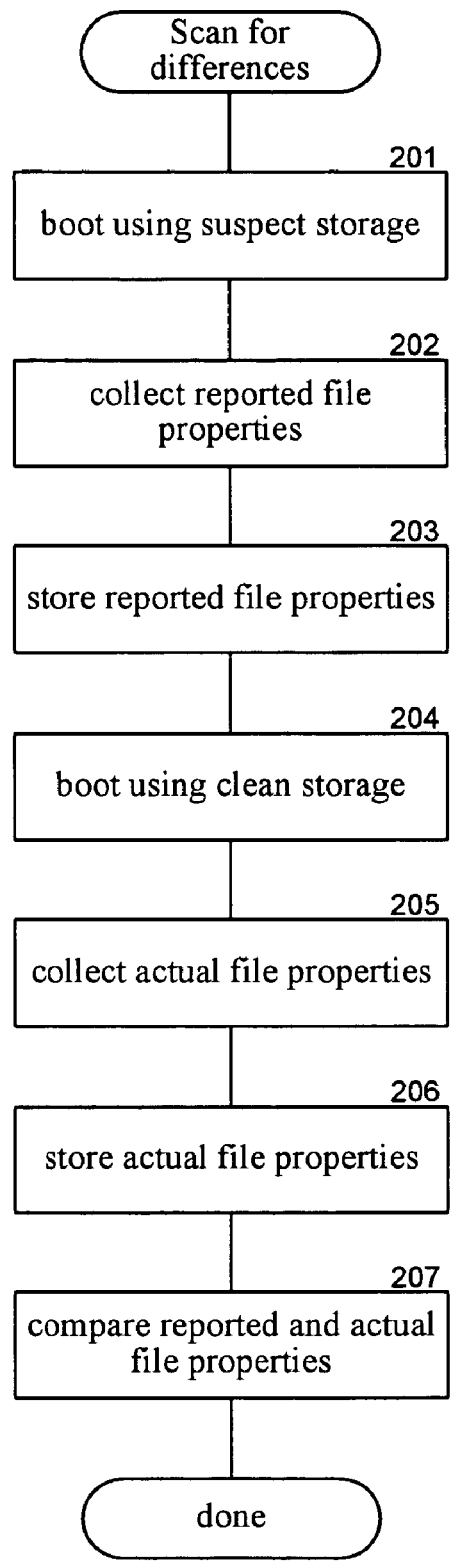
FIG. 2 is a flow diagram that illustrates the scanning for differences between reported file properties and actual file properties in one embodiment.

FIG. 2 is a flow diagram that illustrates the scanning for differences between reported file properties and actual file properties in one embodiment. In block 201, the computer system is booted from the suspect storage device. If the suspect storage device is the primary boot storage device, then the booting may occur automatically at power on of the computer system. In block 202, the suspect operating system loaded during the boot process is requested to report the file properties of the suspect storage device. The request may be made by a user issuing a directory display command or by software of the detection system issuing a system call. In block 203, the reported file properties are stored on the suspect storage device or some other storage device. In block 204, the computer system is booted using a clean storage device, such as a CD-ROM. The user may connect the clean storage device to the computer system (e.g., insert a CD-ROM into a drive) and request the BIOS to boot from the clean storage device rather than the suspect storage device. In block 205, the detection system requests the clean operating system to collect actual file properties from the suspect storage device. In block 206, the actual file properties may be stored on the suspect storage device. In block 207, the reported file properties and the actual file properties are compared. If a significant difference exists, then the suspect storage device may be assumed to be infected. If a significant difference does not exist, then any malware may be truthfully reporting the file properties. If so, the detection system may check the actual or reported file properties for signatures of known malware. The detection system may also compare the last reported file properties to the current reported file properties to detect the presence of malware that is not attempting to hide. The detection system may also check the hash codes of the files to ensure they have not been modified.

Figure 3:
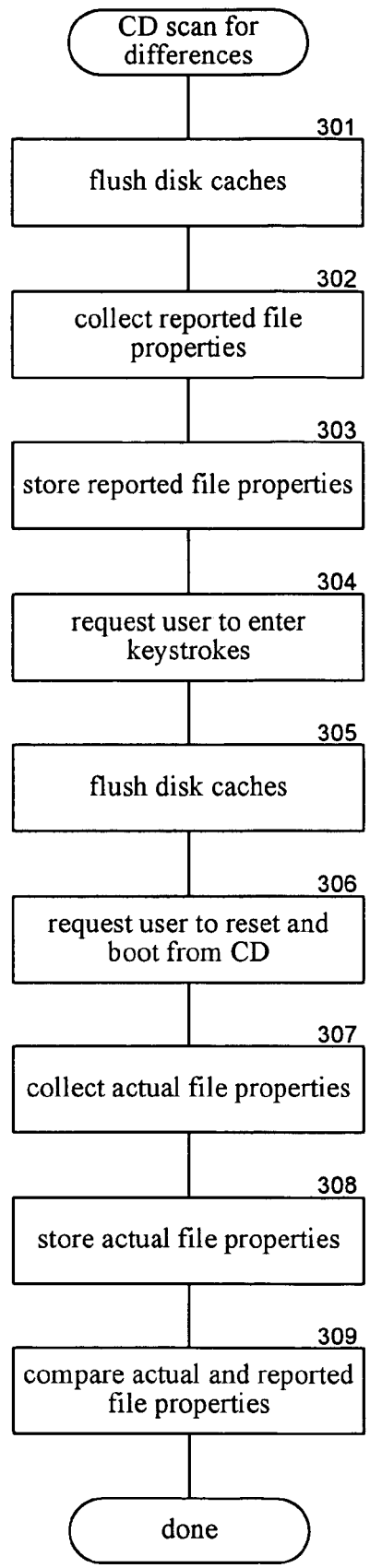
FIG. 3 is a flow diagram that illustrates the processing of scanning for differences between reported file properties and actual file properties that is initiated upon connecting a removable device to a computer system in one embodiment.

FIG. 3 is a flow diagram that illustrates the processing of scanning for differences between reported file properties and actual file properties that is initiated upon connecting a removable device to a computer system in one embodiment. The removable device, such as a CD-ROM, is a bootable device containing a clean operating system and an automatic execute program. When the CD-ROM is connected to the computer system, the automatic execute capability of the computer system starts the automatic execution program of the detection system stored on the CD-ROM. That program controls the collecting of the reported file properties. When the computer system is subsequently reset, the computer system boots from the CD-ROM loading the clean operating system and passing control to the detection system, which may be automatically started. The detection system then collects the actual file properties and performs the comparison. In block 301, the detection system flushes any suspect storage device caches to ensure that the suspect storage device contains the most recent changes. In block 302, the detection system collects the reported file properties of the suspect storage device from the suspect operating system. In block 303, the detection system stores the reported file properties. In block 304, the detection system requests the user to enter keystrokes. In block 305, the detection system flushes the caches to ensure that changes to any file as a result of the keystrokes have been reflected in the suspect storage device. In block 306, the detection system requests the user to reset the computer and boot from the CD-ROM that contains the clean operating system. In block 307, when the detection system starts up after being booted from the CD-ROM, it requests the clean operating system to provide the actual file properties from the suspect storage device. In block 308, the detection system stores the actual file properties. In block 309, the detection system compares the reported file properties and the actual file properties. The detection system then completes.

Figure 4:
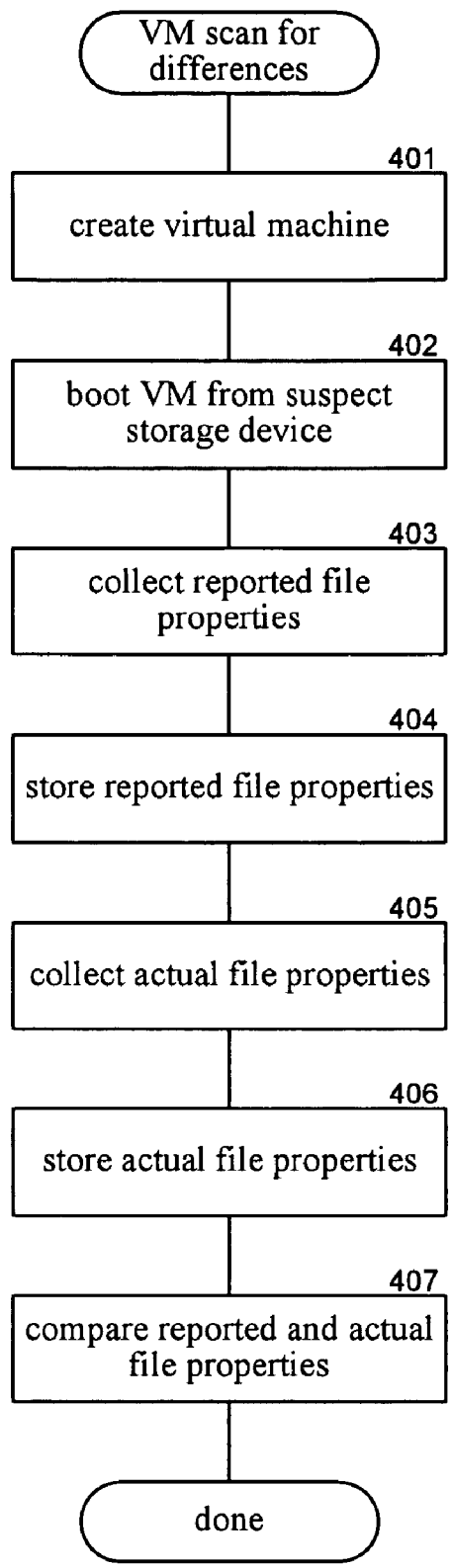
FIG. 4 is a flow diagram that illustrates the scanning for differences between reported and actual file properties when a virtual machine is booted from the suspect storage device in one embodiment.

FIG. 4 is a flow diagram that illustrates the scanning for differences between reported and actual file properties when a virtual machine is booted from the suspect storage device in one embodiment. The computer system is initially booted from a clean storage device and the detection system is started. In block 401, the detection system creates a virtual machine environment. In block 402, the detection system boots the virtual machine from the suspect storage device that contains the suspect operating system. In block 403, the detection system collects reported file properties from the suspect operating system. In block 404, the detection system stores the reported file properties. In block 405, the detection system executing outside the virtual machine collects actual file properties of the suspect storage device via the clean operating system. In block 406, the detection system stores the actual file properties. In block 407, the detection system compares the reported file properties to the actual file properties and then completes.

One skilled in the art will appreciate that although specific embodiments of the detection system have been described herein for purposes of illustration, various modifications may be made without deviating from the spirit and scope of the invention. Since system configuration information is stored in files (e.g., registry files), the detection system can be used to detect attempts by malware to hide configuration information. Because the registry information can be rather extensive, the detection system may focus its comparison on important registry entries, such as automatic startup entries that identify code that is automatically started whenever the computer system is booted. In addition, a file of a suspect storage device may contain multiple streams. The detection system may treat each stream as a separate file when performing the comparison of file properties. In one embodiment, a clean operating system may be stored on a server, in which case the clean storage device would be considered part of the server. Whenever a computer system is started, it may check to see whether it should boot from the server so that the detection system can check for an infection. Accordingly, the invention is not limited except by the appended claims.

We claim:

1. A computer-based method for detecting an infection of a first operating system, the method comprising:
    booting a computing device with a processor and memory under control of the first operating system and loading a suspect storage device having a plurality of files;
    requesting that the first operating system provide file properties of the plurality of files stored on the suspect storage device, the file properties provided by the first operating system being first file properties, such that when the first operating system is infected, it provides first file properties of the plurality of files that are inaccurate in an attempt to conceal the infection of the first operating system; storing the first file properties provided by the first file system;
    booting the computing device with the processor and memory under control of a second operating system and loading the suspect storage device, the second operating system being known to be clean;
    requesting that the second operating system provide the same file properties of the plurality of files stored on the suspect storage device, the file properties provided by the second operating system being second file properties;
    storing the second file properties provided by the second file system; and
    comparing by the computing device the stored first file properties and the stored second file properties to identify differences that may indicate an infection of the first operating system based on the first file properties being inaccurate.

2. The method of claim 1 wherein the second operating system is contained on a second storage device that includes an automatic execute program that controls the requesting of the file properties from the first operating system when the second storage device is connected to a computer system.

3. The method of claim 1 including analyzing the file properties for a signature of an infection when the comparing does not indicate an infection.

4. The method of claim 1 including, after receiving the collected first file properties from the first operating system and before requesting the collected second file properties from the second operating system, receiving input data that is logged by the first operating system.

5. The method of claim 1 wherein the first operating system executes within a virtual machine controlled by execution of the second operating system.

6. The method of claim 1 including when the comparing does not indicate an infection, comparing the first collected file properties to previously collected actual file properties to identify a visible infection.

7. The method of claim 1 including when the comparing does not indicate an infection, performing a file-hash comparison of files of the first storage device.

\* \* \* \* \*

UNITED STATES PATENT AND TRADEMARK OFFICE
CERTIFICATE OF CORRECTION

PATENT NO. : 7,627,898 B2 Page 1 of 1
APPLICATION NO. : 10/997768
DATED : December 1, 2009
INVENTOR(S) : Beck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1004 days.

Signed and Sealed this

Second Day of November, 2010

David J. Kappos
*Director of the United States Patent and Trademark Office*